United States Patent [19]

Cook

[11] Patent Number: 4,981,629

[45] Date of Patent: Jan. 1, 1991

[54] METHOD OF APPLYING CAULKING

[76] Inventor: Jacob J. Cook, Rte. 3, Box 171-A, Jacksonville, Ark. 72076

[21] Appl. No.: 384,441

[22] Filed: Jul. 25, 1989

[51] Int. Cl.[5] .................... B05C 17/005; B05C 17/10; B28B 1/29; B32B 31/06

[52] U.S. Cl. .................................... 264/33; 264/31; 264/35; 264/261; 401/261; 425/87; 425/458; 425/461

[58] Field of Search .................................... 264/31-35, 264/261; 401/261, 266; 425/87, 458, 461

[56] References Cited

U.S. PATENT DOCUMENTS

| | | | |
|---|---|---|---|
| 1,444,227 | 2/1923 | Weber | 425/87 |
| 1,866,295 | 7/1932 | Christman | 425/87 |
| 2,138,696 | 11/1938 | Francis | 425/87 |
| 2,229,839 | 1/1941 | Crewe | 425/87 X |
| 2,836,333 | 5/1958 | Woodel . | |
| 2,847,700 | 8/1958 | Knight | 425/458 X |
| 2,953,285 | 9/1960 | McKelvey . | |
| 3,087,654 | 4/1963 | Moore . | |
| 3,191,809 | 6/1965 | Schultz et al. . | |
| 3,439,839 | 4/1969 | Schumann et al. . | |
| 3,559,234 | 2/1971 | Swayze | 425/461 X |
| 4,382,530 | 5/1983 | Calisto | 227/567 |
| 4,502,814 | 3/1985 | Trimble | 401/266 X |
| 4,570,834 | 2/1986 | Ward | 425/87 X |

FOREIGN PATENT DOCUMENTS

| | | | |
|---|---|---|---|
| 2220813 | 11/1972 | Fed. Rep. of Germany | 425/458 |

*Primary Examiner*—Jan H. Silbaugh
*Assistant Examiner*—Karen D. Kutach
*Attorney, Agent, or Firm*—Zarley, McKee, Thomte, Voorhees & Sease

[57] ABSTRACT

A combined caulk application-striking tool is shown which is an elongated tube having a rearward end, and a forward end, the forward end having an upper wall, lower wall and two side walls. These walls are generally trapezoidal in cross section, and the upper and lower walls are substantially straight in cross section. The forward end of the elongated tube is inclined with respect to the longitudinal axis of the tube, from the upper wall rearwardly down to the lower wall. The tool may be used to apply caulk with the configuration forcing the caulk into the joint or opening and smoothing it. The tool may be also rotated so that the upper wall of the forward end is perpendicular to the area to be sealed, further forcing caulk into the joint or opening and providing for a flattened surface of the caulk.

2 Claims, 2 Drawing Sheets

METHOD OF APPLYING CAULKING

BACKGROUND OF THE INVENTION

This invention relates to a tool used when applying caulk to a surface. Specifically, it is a combination tool which provides for improved application of caulk to a surface, and which also is used in striking or smoothing the caulk before and after it has been applied.

Typically, caulk is provided in an elongated tube having an opening on one end and the tube placed inside a caulking gun. The gun has a trigger which forces a ratcheted bar into the rearward end of the caulk tube. This bar then forces the caulk out through an opening at the forward end of the tube. Such caulking tubes are often provided with a plastic nozzle which may be attached over the hole at the forward end of the caulking tube or is already in place on the caulking tube. If necessary, the plastic nozzle can be cut to the desired size of opening and the caulk passes out the hole in the forward end of the tube, through the nozzle opening, and onto the surface to which it is to be applied.

The caulk is usually applied to an open area or joint to be sealed between two surfaces, such as in sealing the space between a bathtub and adjacent tiles. Once the caulk has been squeezed into the open area between the surfaces, it then must be "struck" or smoothed in order to flatten the top surface of the caulk and to fill any gaps which may have formed when the caulk has been applied. Striking the caulk may be done with a separate striking tool which forces the caulk down into the joint or space while smoothing the caulk surface. Alternatively, it is also possible for the user to press a finger into the caulk and run it down the line of applied caulk so as to fill gaps and provide a flat smooth surface. Filling gaps and open areas is necessary in order to provide a better seal, to discourage cracking, and to encourage water runoff.

A primary object of this invention is to provide a combined caulking applicator and striking tool.

Another object of the invention is to provide for a tool which applies caulk to a surface in an improved manner so as to adequately seal the area to be caulked.

A further object of the invention is to provide for an applicator which may be alternatively used as a striking tool to smooth applied caulk and fill any open spaces.

Yet another object of the invention is to provide for a tool which applies a flattened bead of caulk to a surface, as opposed to a rounded bead of caulk.

A still further object of the invention is to provide for a caulking applicator and striking tool in which caulk is applied in a manner to encourage water runoff.

Another object of the invention is to provide for a caulk applicator and striking tool which is economical to manufacture, convenient to use, and saves time and expense.

Further objects of the invention will become evident in the description which follows.

DETAILED DESCRIPTION OF THE DRAWINGS

DETAILED DESCRIPTION OF THE INVENTION

Figure 4:
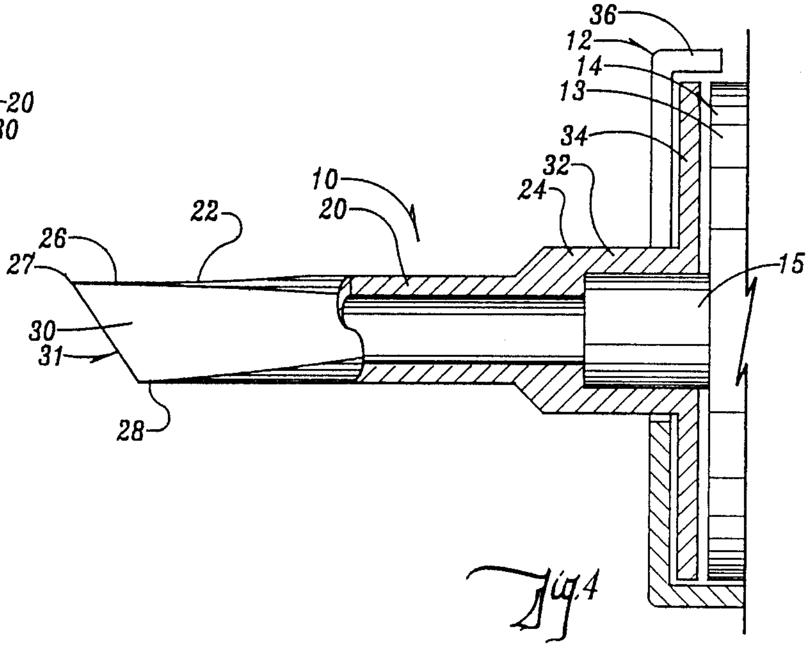
FIG. 4 is a cross section side view of the device of this invention.

The applicator-striking tool of this invention is generally designated by the reference numeral 10. Inside a caulking gun 12 is fitted a caulking tube 14 containing caulk. As best seen in FIG. 4, the applicator striking tool 10 is fitted over the caulking tube nozzle 15 at the forward end 13 of the tube. Caulk 16 is forced out of the caulking tube 14 through device 10 and into joint 17 between tiles 18. Caulk 16 is forced out of caulking tube 14 by pulling trigger 19 of caulking gun 12 which forces ratchet bar 21 into the rearward 23 end of the caulking tube. This squeezes caulk forward in caulking tube 14 so that it passes through the nozzle 15 of tube 14 and through applicator striking tool 10.

Figure 1:
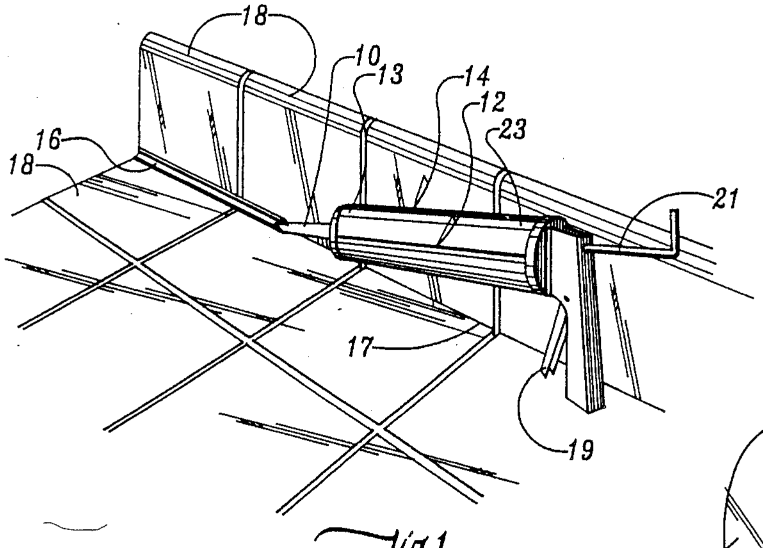
FIG. 1 is a perspective view of the device of this invention in use.
Figure 2:
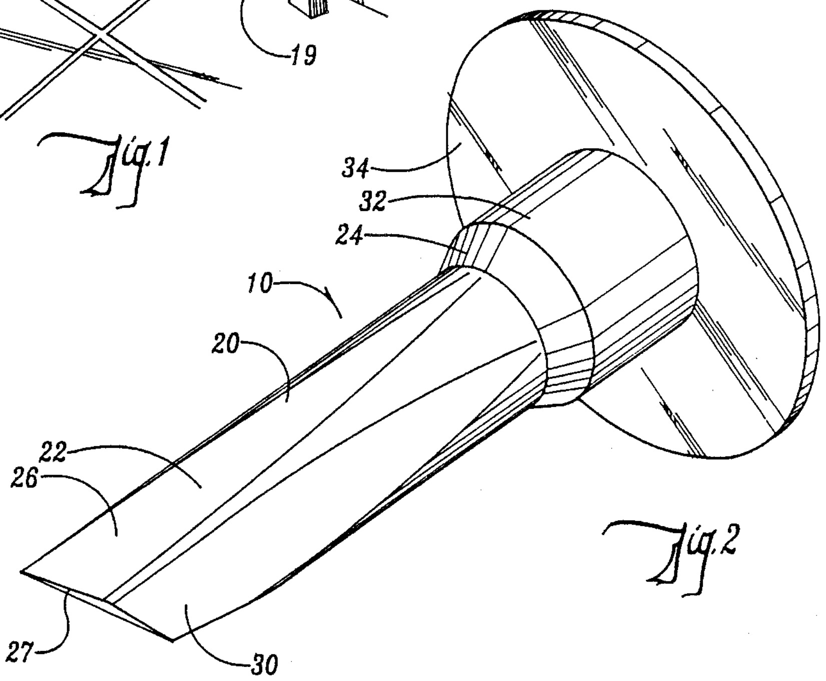
FIG. 2 is an enlarged perspective view of the device of this invention.

In FIG. 2, the device of the invention may be seen in more detail. Applicator striking tool 10 consists of an elongated tube 20 having a forward end 22 and a rearward end 24. Forward end 22 includes an upper wall 26, a lower wall 28, and two side walls 30. As can be seen in more detail in FIG. 3, the two side walls 30 converge toward lower wall 28. Lower wall 28 is substantially narrower than upper wall 26. As can be seen from FIG. 3, this configuration of the walls forms opening 31, and has a generally trapezoidal appearance.

Figure 3:
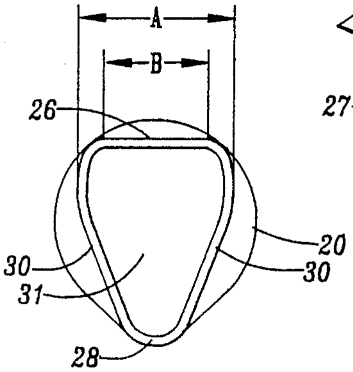
FIG. 3 is a front view of the device of this invention.

In the preferred embodiment of this invention, upper wall 26 and side walls 30 are substantially straight in cross section. Lower wall 28 may also be substantially straight in cross section, or it may be curved, as seen in FIG. 3.

This trapezoidal configuration of the walls of forward end 22 causes the caulk to be forced out not as a rounded bead, as with other applicators, but rather as a trapezoid configuration with the narrower bottom portion being the leading edge. This allows caulk to be forced into the joint 17 between the tiles 18 or other surface to be caulked so that joint 17 is more adequately filled with caulk and the uppermost portion of the caulk 16 applied is flatter and smoother.

Further, FIGS. 2 and 4 show that the forward end 22 is cut or otherwise provided at an inclined angle with respect to the longitudinal axis of elongated tube 20 from upper wall 26 rearwardly toward lower wall 28. Additionally, because upper wall 26 is substantially straight in cross section or flattened at the top, a straight edge 27 is formed by upper wall 26. A protruding straight upper wall 26 provides additional assistance in forcing the caulking down into opening 17 of tiles 18 and assists in allowing the tool 10 to be used additionally as a striking tool.

At rearward end 24 of elongated tube 20, any one of a variety of means may be provided for attaching device 10 to the caulking tube 14. For example, rearward end 24 may have an enlarged portion 32, which is press fit over nozzle 15 of tube 14. Enlarged portion 32 may also be fitted with internal threads adapted to screw onto nozzle 15, which is usually made of plastic.

To assure that device 10 is not pushed off of nozzle 15 by the caulking pressure, a circular portion 34 may be provided, radiating outwardly from enlarged portion 32. Circular portion 34 is placed behind lip 36 of caulking gun 12. This secures tool 10 on tube 14 and on caulking gun 12.

In one embodiment, the tube, if made of plastic, for example, may be cut at any point and the size of the opening 31 will be larger as the tube is cut closer to rearward end 24. In this manner, one can select the size of opening 31.

Figure 5:
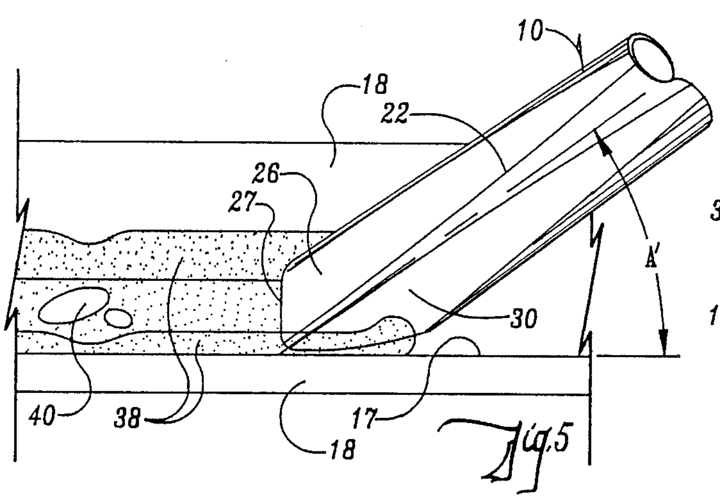
FIG. 5 is a side elevational view showing the device of this invention in use.
Figure 6:
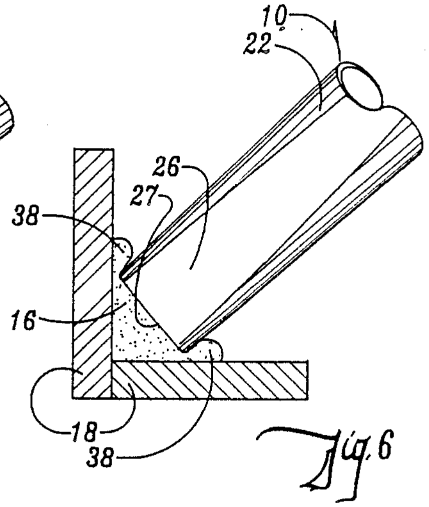
FIG. 6 is a top plan view of the device of this invention in use.

FIGS. 5 through 10 show the device of this invention in use. FIG. 5 demonstrates tool 10 placed against the joint 17 to be sealed. The tool 10 is placed against the joint 17 so that opening 31 of forward end 22 is flush with the joint 17. In FIG. 5, device 10 is angled at about 45° (as represented by angle A' in FIG. 5). The trapezoid configuration of the walls combined with the angled opening 31 forces caulk 16 more completely into joint 17 than devices previously used. Furthermore, the straight upper wall 26 assists in smoothing caulk 16 along joint 17. FIG. 6 shows the caulk being applied in this manner. Excess caulk 38 is forced outwardly adjacent of the sides of forward end 22

Figure 7:
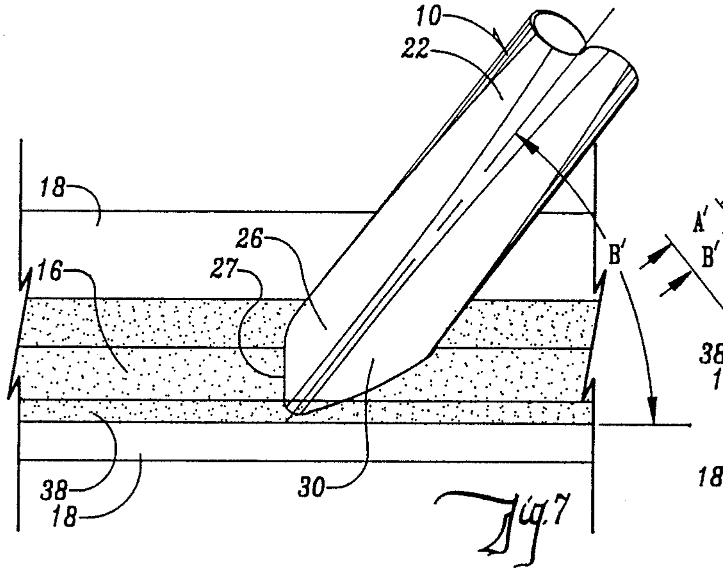
FIG. 7 is a side elevational view of the device of this invention in use.
Figure 8:
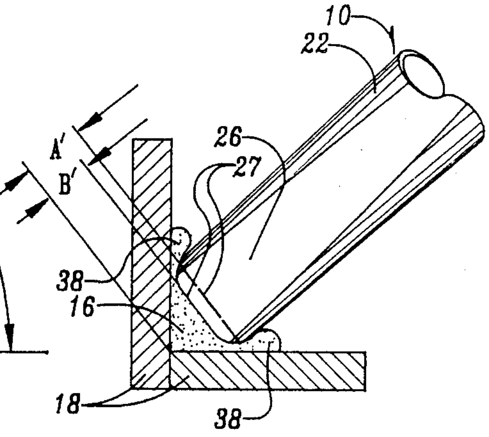
FIG. 8 is a top plan view of the device of this invention in use.

Primarily as a result of the method of forcing the caulk out of the caulking tube 14, in which the trigger 19 is repeatedly squeezed and released so as to advance ratchet bar 21, caulk 16 does not flow out of caulking tube 14 and the tool 10 in a consistent manner. Thus, despite the improved configuration of the tool 10, it is possible that inconsistencies or voids 40 will occur in caulking 16 as it is applied. To further assist in removing these voids and to aid in providing a flattened top surface of caulking 16 after the caulk is applied, the tool 10 may be rotated further so that its longitudinal axis is greater than 45° up to 90° with respect to the longitudinal axis of applied caulk 16. As shown in FIG. 7, by angle B', an angle of about 60° is employed. This increase angle allows the upper wall 26 with its straight forward edge 27 to be used to further force caulk into any voids which may appear and to additionally cause a flattened top surface to caulk 16.

When the tool is angled at approximately 45° (as shown at FIGS. 5 and 6), the contact points of forward end 22 are those as shown at A in FIG. 3. When rotated further at an angle greater than 45° (as the 60° angle in FIGS. 7 and 8), the contact points of forward end 22 are higher on the forward end 22, as shown at B in FIG. 3. This permits the straight edge 27 of upper wall 26 to even further force caulk down into joint 17.

Figure 9:
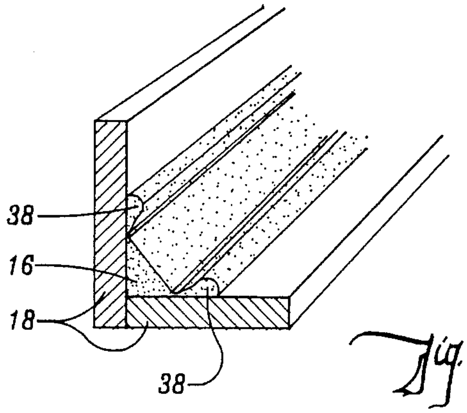
FIG. 9 shows caulk applied by the device of this invention prior to trimming.
Figure 10:
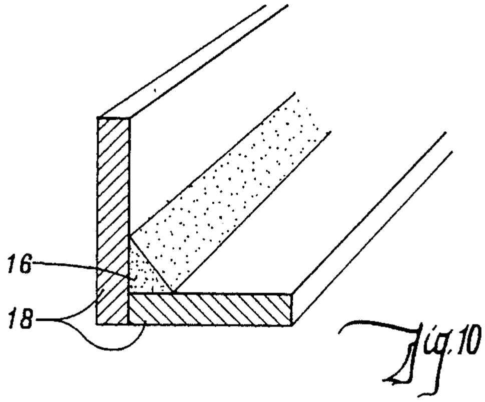
FIG. 10 shows caulk applied by the device of this invention after trimming.

FIG. 9 shows caulk 16 after being applied using this device and method, and, as can be seen, some excess caulk 38 is left at the sides. This may be easily trimmed using, for example, a razor blade, resulting in a neat sealing strip of caulk 16, as shown at FIG. 10, which has a substantially flat upper surface.

The tool 10 may be manufactured out of any acceptable material. Typically, applicators are made of plastic, but any other suitable material may be employed, including metal.

The foregoing embodiment is set forth as only one example of the device of this invention, and adaptations may be made without departing from the spirit and scope of the invention.

Thus, it can be seen that the invention accomplishes at least all of its objectives.

What is claimed is:

1. A method of applying caulk with a caulking tube to an open area to be sealed between two surfaces, the open area having a longitudinal axis, comprising:

forcing the caulk through an elongated tube attached to the nozzle of the caulking tube to apply the caulk to the open area, the elongated tube having a rearward end, and a forward end generally trapezoid in cross section having a protruding upper wall, two side walls, and lower wall substantially narrower in width than the upper wall with the upper wall and side walls substantially straight in cross section, the walls forming an opening which is at an inclined angle from the upper wall rearward to the lower wall such that the upper wall protrudes further forward than the rearward wall, the caulk exiting the elongated tube in a generally trapezoidal shape in cross section such that the applied caulk adequately fills the open area, and smoothing the caulk during the forcing and applying of the caulk by positioning the elongated tube with the longitudinal axis of the elongated tube at an angle of about 45° with respect to the longitudinal axis of the open area; and smoothing the applied and smoothed caulk with the elongated tube by positioning the longitudinal axis of the elongated tube at an angle of greater than 45° up to about 90° with respect to the longitudinal axis of the open area which has been filled with the applied and smoothed caulk, and passing the positioned elongated tube over the open area which has been filled with the applied and smoothed caulk to further force the applied and smoothed caulk into the open area and provide for a flattened surface of the applied caulk.

2. The method of claim 1 wherein the caulk is forced through the elongated tube and smoothed while positioning the elongated tube with the longitudinal axis of the elongated tube at an angle of about 45° with respect to the longitudinal axis of the open area, and wherein the applied and smoothed caulk is smoothed with the longitudinal axis of the elongated tube at an angle of about 90° with respect to the longitudinal axis of the open area which has been filled with the applied and smoothed caulk.

* * * * *